United States Patent
Kou et al.

(10) Patent No.: US 8,429,507 B1
(45) Date of Patent: Apr. 23, 2013

(54) DEVICE AND METHOD FOR DETECTING AND CORRECTING ERRORS IN A DATA STREAM

(75) Inventors: Peter Kou, San Jose, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 1119 days.

(21) Appl. No.: 12/355,687

(22) Filed: Jan. 16, 2009

Related U.S. Application Data

(62) Division of application No. 10/895,157, filed on Jul. 19, 2004, now Pat. No. 7,493, 550.

(60) Provisional application No. 60/539,238, filed on Jan. 26, 2004.

(51) Int. Cl.
H03M 13/00 (2006.01)

(52) U.S. Cl.
USPC .......................................................... 714/777

(58) Field of Classification Search .................. 714/768, 714/777, 781–783; 360/48, 51
See application file for complete search history.

(56) References Cited

U.S. PATENT DOCUMENTS

| | | | |
|---|---|---|---|
| 5,469,452 A | | 11/1995 | Zehavi |
| 6,005,727 A | * | 12/1999 | Behrens et al. .................. 360/48 |
| 6,226,138 B1 | * | 5/2001 | Blaum et al. ..................... 360/48 |
| 7,047,477 B2 | | 5/2006 | Tolhuizen et al. |

OTHER PUBLICATIONS

Michael Hess, Error detecting unit distance codes, 10, 1990, IEEE Transactions on Instrumentation & Measurement, vol. 39, No. 5, pp. 703-734.

Matthew P. Vea et al., Magnetic recording channel model with inter track interference, 1991, IEEE, p. 1-3.

* cited by examiner

Primary Examiner — Shelly A Chase

(57) ABSTRACT

A device for detecting and correcting errors in a data stream. For example, a device for detecting and correcting errors in a data stream including identifiers for a track address or identifiers for encoded words in a wireless transmission. The devices employ a class of error correction codes to, for instance, encode track addresses on a surface of a data storage medium. The encoding modifies natural track addresses so that the difference between bit sequences in adjacent track addresses is constant while simultaneously enabling both error detection and error correction, thereby enabling more accurate head positioning in a data storage device, in one embodiment.

20 Claims, 7 Drawing Sheets

DEVICE AND METHOD FOR DETECTING AND CORRECTING ERRORS IN A DATA STREAM

CROSS-REFERENCE TO RELATED APPLICATIONS

The present application is a divisional of U.S. application Ser. No. 10/895,157 filed Jul. 19, 2004, which claims priority under 35 U.S.C. §119(e) from U.S. Provisional Application No. 60/539,238, filed Jan. 26, 2004. The contents of both of these applications are incorporated herein by reference.

FIELD OF THE INVENTION

This invention relates to methods and apparatus employing error correction codes in servo systems for controlling the path and/or position of a reading/recording head with respect to a surface of a data storage medium in data storage devices such as hard disk drives. The invention is also applicable to any data storage device employing a servo system, or a chip for receiving and processing information in a read and/or write circuit.

BACKGROUND OF THE INVENTION

Servo systems for assisting in seeks and fine positioning of reading/recording heads for data storage devices are well known. For storage devices employing rotating media, such as hard disk drives, these servo systems generally involve the reading of certain data patterns (sometimes called "servo data") recorded in one or more places on a hard disk surface which a head traverses. A not insignificant aspect of hard disk drive performance is access time, sometimes considered as the time it takes a head to go from one track to another on a disk surface. The shorter the access time, the better the performance.

When seeking to a particular track, the head will cross one or more tracks, and may read the addresses of tracks that the head traverses during the seek. In order for the head to arrive as quickly as possible at the correct track, it is desirable for the head to know what tracks it is traversing, at least in a relative sense, so that the head positioning system can accelerate or decelerate the head appropriately. If a head reads a track address inaccurately, a seek operation can take longer.

During a seek operation (such as those described above), a type of error known as inter-track interference is likely to occur where two adjacent addresses differ. To counter inter-track interference, Gray codes are usually used to ensure that adjacent track addresses on a disk surface differ in one and only one position. However, while Gray coded track addresses help to limit track ambiguity to one track during an offtrack condition, this type of coding does not permit correction of bit errors.

Also during a seek operation, it is practically inevitable that read back servo signals will contain noise that causes bit errors outside the position where two adjacent tracks differ. It would be desirable to provide a way of coding track addresses on data storage media so that the head positioning system can read the addresses accurately, and in particular, be able to correct at least certain types of bit errors that can occur during the reading process.

SUMMARY OF THE INVENTION

An embodiment of the present invention provides error correction codes whose minimum distance is a constant distance, $d_{min}$, which is greater than 1 (that is, adjacent codewords differ by exactly $d_{min}$ bits). The feature of a constant distance between adjacent words ensures that in an offtrack condition, a decoder used in conjunction with an embodiment of the instant invention will decode a track number to one of the two neighboring tracks. Such a result is not guaranteed by any previous encoding method. It is therefore a general object of the present invention to encode a cyclic code in such a way that adjacent codewords differs by exactly $d_{min}$, or as close to $d_{min}$ as is reasonably practicable. In one embodiment, adjacent codewords differ by exactly $d_{min}$.

Additionally, it is also a general object of the present invention to encode data using error correcting codes. In one embodiment, the tracks of a readable medium are encoded such that any two adjacent encoded track addresses differ by a constant number. Moreover, this type of coding enables correction of at least one random error per bit sequence constituting the track address. In one aspect, the invention uses a cyclic code, such as a Hamming code, or variations thereof, to encode the track address. However, the invention is not limited to Hamming codes, but applies to cyclic codes or to codes having pertinent properties of cyclic codes, as the ordinarily skilled artisan will appreciate.

BRIEF DESCRIPTION OF THE DRAWINGS

The invention, both as to its organization and manner of operation, may be further understood by reference to the drawings that include FIGS. 1-7 taken in connection with the following detailed description.

DETAILED DESCRIPTION OF THE EMBODIMENTS

The following description of illustrative non-limiting embodiments of the invention discloses specific configurations and components. However, the embodiments are merely examples of the present invention, and thus, the specific features described below are merely used to describe such embodiments and to provide an overall understanding of the present invention.

Accordingly, skilled artisans readily recognize that the present invention is not limited to the specific embodiments described below. Furthermore, the descriptions of various configurations and components of the present invention that are known to one skilled in the art are omitted for the sake of clarity and brevity.

As one example of a cyclic code used in an embodiment of the present invention, a Hamming code is provided which has parameters (n, k), where [n=$2^m$−1] is the length of the code, k=n−m is the dimension of the code, m is any integer and $d_{min}$=3 (that is, any two different code words have a minimum difference of three bits). This difference is referred to as a Hamming distance. However, it is important to note that Hamming distances are not specific to Hamming codes. Any code, including but not limited to Hamming codes, that meet the invention's requirements as set forth herein may yield Hamming distances. A servo system implementing a Hamming code in accordance with the present invention is tolerant to three bits of ambiguity during a seek operation and is further capable of correcting any single bit error, as explained below.

Figure 1:
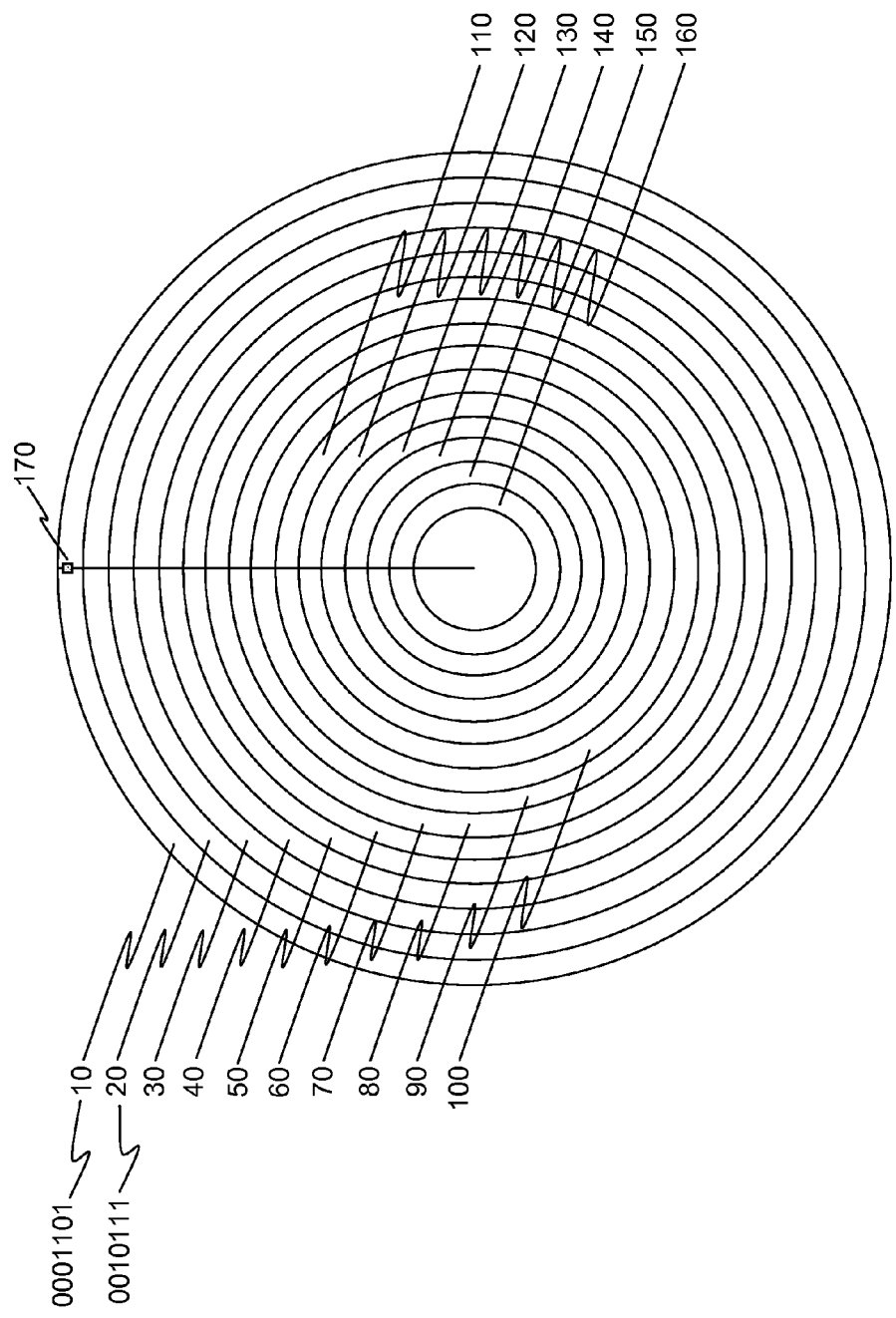
FIG. 1 illustrates the tracks on a hard drive, as an example of a data storage device to which the present invention applies.

FIG. 1 illustrates very simplistically a surface of a disk in a hard disk drive. For ease of description, the disk surface is shown with 16 tracks numbered 10 through 160, respectively, though of course a disk surface may contain thousands of tracks. A read head 170 is shown. In this example of the invention, a (7, 4) Hamming code is implemented. The ordinarily skilled artisan readily understands that additional Hamming codes may be utilized in implementing the invention, including but not limited to the following: (3, 1), (15, 11), and (31, 26), among others.

Additionally, other codes may be utilized, including cyclic codes other than Hamming codes. In FIG. 1, the tracks numbered 10 and 20 are encoded as addresses 0001101 and 0010111, respectively, as implemented through use of a (7, 4) Hamming code. During a seek operation, the most likely detected words from the previously encoded tracks are shown below in Table 1.

TABLE 1

(Showing Bit Place Indices 0-6, from Left to Right)

0001101
0010111
0000101
0001111
0011100
0010101
0011111
0000111

The detected words in Table 1 contain seven (7) bits which fill seven bit places, zero (0) through six (6) going left-to-right. Of all of the bit places, bit places 2, 3 and 5 are the most likely to contain errors because of the likelihood that a corresponding bit place in an adjacent bit-word has changed from bit-word to bit-word. This type of error is known as inter-track interference.

The potential for inter-track interference is shown, for example, by bit places two (2) and three (3) in the first two bit-words in Table 1 being exactly opposite (while noting that the bit sequences begin at "0" going from left to right). That is, the second and third bit places in the first codeword in Table 1 are represented by 01, while the second and third bit places in the second codeword in Table 1 are represented by 10. Because these bits are among the most likely mistaken bits in this example, the most likely place for error is in those corresponding bit places that differ for the most-likely detected words. Therefore, bit places two (2) and three (3) in the first two bit-words, above, are an example of bit places that are most likely to possess errors resulting from inter-track interference. However, the invention's use of a convolution to modify a track address provides the ability to detect all errors and correct at least one bit error, while keeping the difference between adjacent code bit sequences a constant number of bits. The difference between adjacent code bit sequences is a constant number of bits, this constant number equaling $d_{min}$, or the minimum Hamming distance. One example of the invention's convolution uses a modified Hamming code.

A modified Hamming code is implemented because a regular Hamming code encoder fails to produce the desired property of adjacent encoded bit sequences being different by $d_{min}$. For instance, in Table 2, below, natural track addresses (as used in a hard disk drive, for instance) have been processed through a systematic Hamming encoder, which produces a code with $d_{min}$=3. Note that the difference from bit sequence to bit sequence is not always a constant three bits. Because the difference is not always 3 bits between adjacent code bit sequences, it is possible that the read head could be sent to locations that are farther away than the read head would be sent in a system implementing the desired property of the present invention where the difference is $d_{min}$. Therefore, the encoding used in the invention guarantees that 1) if the read head is in the offtrack position, the track number decoder will decode to one of the adjacent tracks, and 2) the decoder possesses the ability to correct at least one random bit error.

TABLE 2

| Natural Track Address | Hamming Encoded Address | Bit Differences from Previous Word |
|---|---|---|
| 0000 | 0000000 | n/a |
| 0001 | 1010001 | 3 |
| 0010 | 1110010 | 3 |
| 0011 | 0100011 | 3 |
| 0100 | 0110100 | 4 |
| 0101 | 1100101 | 3 |
| 0110 | 1000110 | 3 |
| 0111 | 0010111 | 3 |
| 1000 | 1101000 | 7 |
| 1001 | 0111001 | 3 |
| 1010 | 0011010 | 3 |
| 1011 | 1001011 | 3 |
| 1100 | 1011100 | 3 |
| 1101 | 0001101 | 3 |
| 1110 | 0101110 | 3 |
| 1111 | 1111111 | 3 |

The encoding used in conjunction with the invention, therefore, applies a novel convolution to the natural track address so that the difference between adjacent code bit sequences is always a constant number of bits (more precisely, the difference between adjacent code bit sequences is always $d_{min}$), and further, the invention simultaneously provides the ability to detect and correct errors, as explained herein. The first step in the convolution is to apply a Gray code to the natural track number, for instance, as shown below in Table 3.

TABLE 3

| Natural Track Address | Gray Code Encoded Address |
|---|---|
| 0000 | 0000 |
| 0001 | 0001 |
| 0010 | 0011 |
| 0011 | 0010 |
| 0100 | 0110 |
| 0101 | 0111 |
| 0110 | 0101 |
| 0111 | 0100 |
| 1000 | 1100 |
| 1001 | 1101 |

TABLE 3-continued

| Natural Track Address | Gray Code Encoded Address |
| --- | --- |
| 1010 | 1111 |
| 1011 | 1110 |
| 1100 | 1010 |
| 1101 | 1011 |
| 1110 | 1001 |
| 1111 | 1000 |

While a Gray code is used as an example for encoding a natural track address, the ordinarily skilled artisan readily comprehends that other codes and/or methods could be used to arrive at $d_{min}$. For example, a search could be performed to arrange the code such that the separation between adjacent tracks is $d_{min}$.

In the example herein, however, a Gray code is used to encode the natural track address, and the resultant Gray code encoded track address is then further encoded. One embodiment of further encoding employs a Hamming code. The ordinarily skilled artisan understands that a Hamming code need not be used, but that other cyclic codes could be implemented.

The weight distribution of a Hamming code is known through the following formula:

$$A(z) = \frac{1}{n+1}\left\{(1+z)^n + n(1-z)(1-z^2)^{\frac{n-1}{2}}\right\}$$

Given an (n, k) Hamming code, it is possible to compute the number of Hamming code words with a minimum weight of three with the following formula:

$$A_3 = \frac{n(n-1)}{6}$$

The invention lists all code words of weight three; these code words of weight three are placed in a matrix G' with $A_3$ rows and n columns; then, $A_3$-k rows are eliminated such that the remaining k rows are linearly independent. Then the k remaining rows form a base which can then be used to further encode the Gray encoded address taken from Table 3, for instance. These features are explained in greater detail below.

A (7, 4) Hamming code provides a generator polynomial of $g(X)=1+X+X^3$. Performing an exhaustive search for all (7, 4) code words of weight three, matrix G' is created as shown in Table 4, below.

TABLE 4

| |
| --- |
| 1101000 |
| 0110100 |
| 0011010 |
| 0001101 |
| 1000110 |
| 0100011 |
| 1010001 |

From Table 4, it can be seen that the top four code words are linearly independent. That is, the top four code words possess the quality of being a full row rank. It is also possible to obtain G directly without constructing G' first. It is always possible to find k independent codewords with a Hamming weight of $d_{min}$, and arrange them as rows of G. The ordinarily skilled artisan readily understands that there are many ways to find independent code words with a Hamming weight of $d_{min}$.

Thereafter, $A_3$-k rows are eliminated such that the remaining k rows are linearly independent. From Table 4, this leaves the top four code words: 1101000, 0110100, 0011010, and 0001101. These code words form generation matrix G. Matrix G is then multiplied against corresponding rows of the Gray code encoded addresses taken from Table 3, providing a final encoded word.

It also is possible to express the foregoing as $v=u_g G$, where v is the final encoded word, $u_g$ is the Gray encoded address, and G is taken from generation matrix G. The results are shown in Table 5, below, as the final encoded track address (a modified Hamming code encoded address). Note that the number of bit differences between adjacent code bit sequences in the final encoded track address is a constant of three.

TABLE 5

| Natural Track Address | Gray Encoded Address | Matrix G | Final Encoded Track Address | Bit differences from Adjacent Word |
| --- | --- | --- | --- | --- |
| 0000 | 0000 | 0000 | 0000000 | 3 |
| 0001 | 0001 | 1101 | 0001101 | 3 |
| 0010 | 0011 | 0111 | 0010111 | 3 |
| 0011 | 0010 | 1010 | 0011010 | 3 |
| 0100 | 0110 | 1110 | 0101110 | 3 |
| 0101 | 0111 | 0011 | 0100011 | 3 |
| 0110 | 0101 | 1001 | 0111001 | 3 |
| 0111 | 0100 | 0100 | 0110100 | 3 |
| 1000 | 1100 | 1100 | 1011100 | 3 |
| 1001 | 1101 | 0001 | 1010001 | 3 |
| 1010 | 1111 | 1011 | 1001011 | 3 |
| 1011 | 1110 | 0110 | 1000110 | 3 |
| 1100 | 1010 | 0010 | 1110010 | 3 |
| 1101 | 1011 | 1111 | 1111111 | 3 |
| 1110 | 1001 | 0101 | 1100101 | 3 |
| 1111 | 1000 | 1000 | 1101000 | 3 |

The encoding used in the invention, therefore, applies a novel convolution to the natural track address so that the distance between adjacent code words is always $d_{min}$. Further, the convolution concurrently provides the inventive error correction circuitry with the ability to both detect and correct errors, as explained herein.

In one aspect of the invention, the generation matrix G can be modified as follows. Let P be a k*k matrix such that $G=PG_{sys}=P[Q|I]$, where $G_{sys}=[Q|I]$ is the generator matrix for the Hamming code in systematic form and I is a k*k identity matrix. An encoder based on this modification is shown in FIG. 2.

Figure 2:
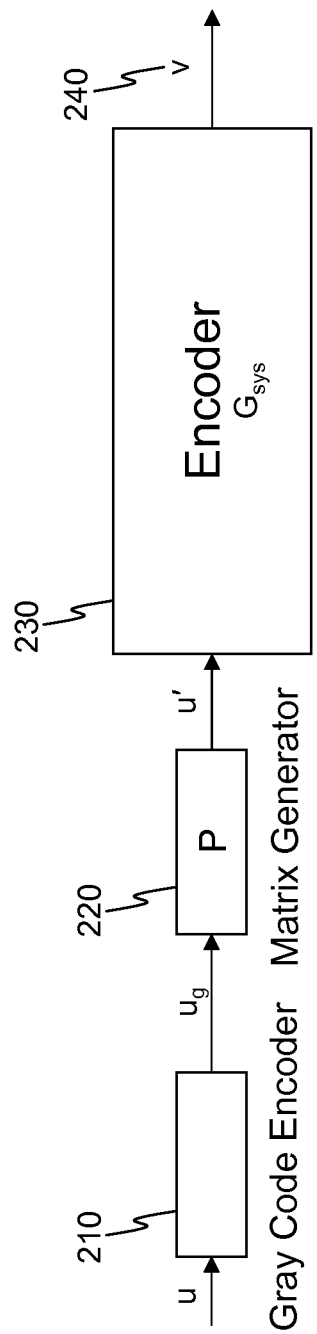
FIG. 2 illustrates one aspect of the invention including an encoder.

In FIG. 2, a natural track address, u, is input to Gray code encoder 210. The Gray code encoder 210 encodes the natural track address to a Gray code address, $u_g$. The Gray encoded address is then input to matrix generator 220, which applies P as a k*k matrix such that $G=PG_{sys}=P[Q|I]$, where $G_{sys}=[Q|I]$ is the generator matrix for the Hamming code in systematic form and I is a k*k identity matrix. The result is then sent to block 230, which is a systematic encoder which encodes the result of block 220 in accordance with the principles of the invention described above, producing final encoded track address v, 240. The ordinarily skilled artisan understands that the features of FIG. 2 (and the invention, overall) may be readily implemented in one or both of hardware and/or software.

P may be found for those Hamming codes with generator polynomials of weight 3. Let $$g(X)=1+g_1X+g_2X^2+\ldots+X^{n-k}$$

be the generator polynomial of a Hamming code, where for one and only one i, $g_i \neq 0$. Then a generator matrix is in the form:

$$G = \begin{bmatrix} 1 & g_1 & g_2 & \ldots & 1 & 0 & 0 & 0 & \ldots & 0 \\ 0 & 1 & g_1 & \ldots & g_{n-k-1} & 1 & 0 & 0 & \ldots & 0 \\ 0 & 0 & 1 & \ldots & g_{n-k-2} & g_{n-k-1} & 1 & 0 & \ldots & 0 \\ \ldots & \ldots & \ldots & \ldots & \ldots & \ldots & \ldots & \ldots & \ldots & \ldots \\ 0 & 0 & 0 & \ldots & 1 & g_1 & g_2 & \ldots & \ldots & 0 \\ \ldots & \ldots & \ldots & \ldots & \ldots & \ldots & \ldots & \ldots & \ldots & \ldots \\ 0 & 0 & 0 & \ldots & 0 & 0 & 1 & g_1 & \ldots & 1 \end{bmatrix}$$

Since the last k columns of G is a lower triangular matrix with all one's on the diagonal, G has full rank of k, therefore providing a generation matrix G, as described previously. The last column k is also a solution of P.

For instance, consider the following vector operation:

u'=uP u is a 1 x k vector

Let $g(X)-1=g_1X+g_2X^2 \ldots +X_{n-k}$ be the generator polynomial for the Hamming code. Therefore, $$P = \begin{bmatrix} 1 & 0 & 0 & \ldots & 0 & 0 \\ g_{n-k-1} & 1 & 0 & \ldots & 0 & 0 \\ g_{n-k-2} & g_{n-k-1} & 1 & \ldots & 0 & 0 \\ \ldots & \ldots & \ldots & \ldots & \ldots & \ldots \\ 0 & 1 & g_1 & \ldots & 1 & 0 \\ 0 & 0 & 1 & \ldots & g_{n-k-1} & 1 \end{bmatrix}$$

Figure 3:
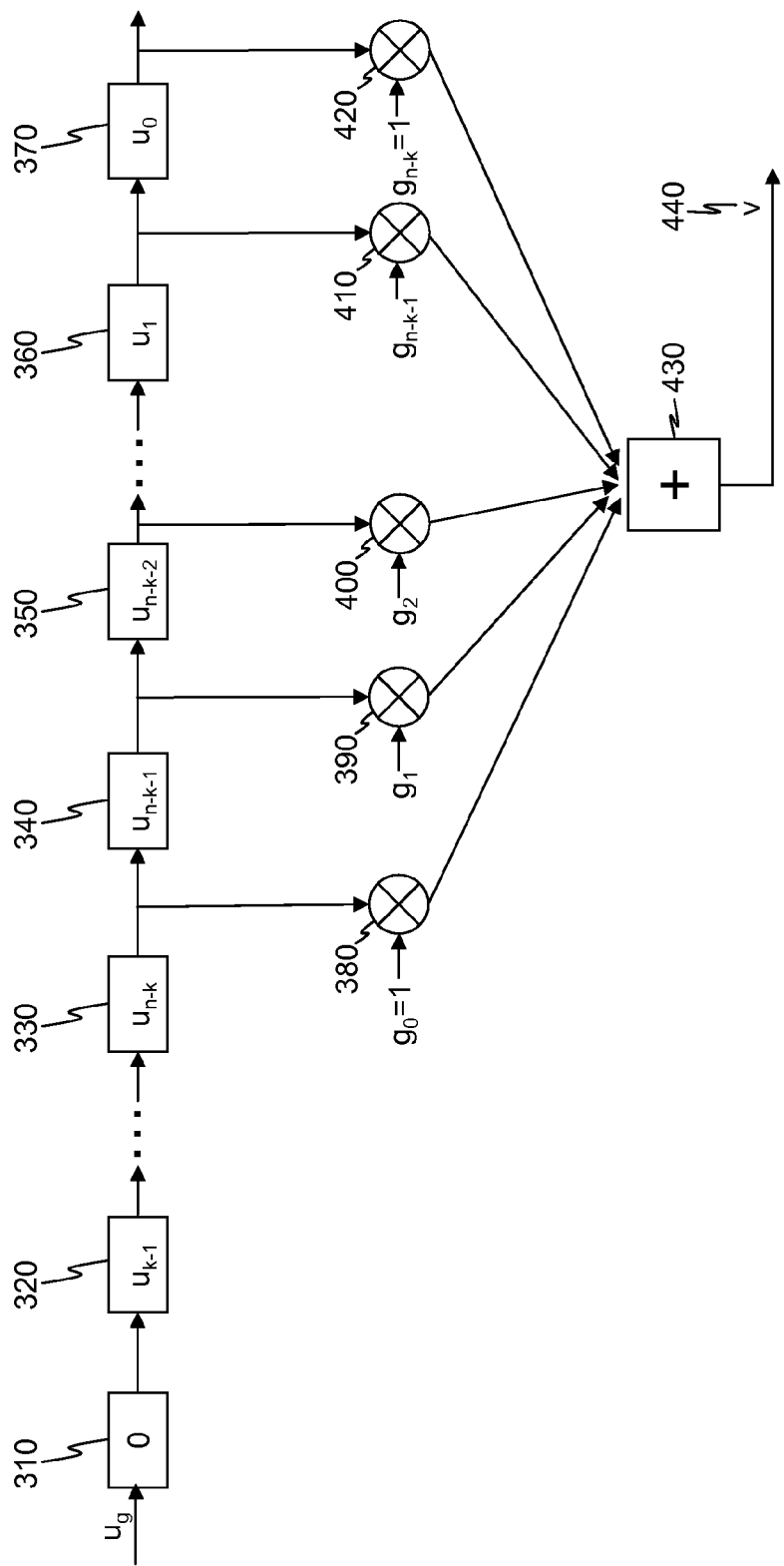
FIG. 3 illustrates shift registers used in an embodiment of the instant invention.

Accordingly, because each row of P is a shift of the previous one, it is easy to implement vector multiplication with shift registers, as is depicted in FIG. 3. Block 310 is a shift register that has been supplied with a Gray code encoded identifier (such as the track addresses as shown in FIG. 1). As subsequent identifiers are read, they are shifted in place from registers 310, 320 . . . , until all of shift registers 310-370 are filled. At every shift, a reading is taken, for instance from between shift registers 330 and 340, and this reading is fed to multiplier 380. Similar readings are taken for multipliers 390-420, as illustrated in FIG. 3. With every shift, the multipliers multiply the readings by a coefficient that has been taken from a generation matrix G, as explained previously. Further, at the end of each shift, adder 430 adds the result of the multipliers 380-420, with the ultimate result being a final encoded track address, v. Those of ordinary skill in the art understand that the invention applies to many applications beyond the encoding and reading of track addresses, however. For example, the invention may be used as described above for wireless transmissions by simply using the identifier for encoded words in a wireless transmission instead of the identifier for a track addresses. Further, the invention may be used for the initial formatting of a data storage medium, as described herein.

The following provides an example of P using a (31, 26) Hamming code:

$$P = \begin{bmatrix}
1&0&0&0&0&0&0&0&0&0&0&0&0&0&0&0&0&0&0&0&0&0&0&0&0&0\\
0&1&0&0&0&0&0&0&0&0&0&0&0&0&0&0&0&0&0&0&0&0&0&0&0&0\\
0&0&1&0&0&0&0&0&0&0&0&0&0&0&0&0&0&0&0&0&0&0&0&0&0&0\\
1&0&0&1&0&0&0&0&0&0&0&0&0&0&0&0&0&0&0&0&0&0&0&0&0&0\\
0&1&0&0&1&0&0&0&0&0&0&0&0&0&0&0&0&0&0&0&0&0&0&0&0&0\\
1&0&1&0&0&1&0&0&0&0&0&0&0&0&0&0&0&0&0&0&0&0&0&0&0&0\\
0&1&0&1&0&0&1&0&0&0&0&0&0&0&0&0&0&0&0&0&0&0&0&0&0&0\\
0&0&1&0&1&0&0&1&0&0&0&0&0&0&0&0&0&0&0&0&0&0&0&0&0&0\\
0&0&0&1&0&1&0&0&1&0&0&0&0&0&0&0&0&0&0&0&0&0&0&0&0&0\\
0&0&0&0&1&0&1&0&0&1&0&0&0&0&0&0&0&0&0&0&0&0&0&0&0&0\\
0&0&0&0&0&1&0&1&0&0&1&0&0&0&0&0&0&0&0&0&0&0&0&0&0&0\\
0&0&0&0&0&0&1&0&1&0&0&1&0&0&0&0&0&0&0&0&0&0&0&0&0&0\\
0&0&0&0&0&0&0&1&0&1&0&0&1&0&0&0&0&0&0&0&0&0&0&0&0&0\\
0&0&0&0&0&0&0&0&1&0&1&0&0&1&0&0&0&0&0&0&0&0&0&0&0&0\\
0&0&0&0&0&0&0&0&0&1&0&1&0&0&1&0&0&0&0&0&0&0&0&0&0&0\\
0&0&0&0&0&0&0&0&0&0&1&0&1&0&0&1&0&0&0&0&0&0&0&0&0&0\\
0&0&0&0&0&0&0&0&0&0&0&1&0&1&0&0&1&0&0&0&0&0&0&0&0&0\\
0&0&0&0&0&0&0&0&0&0&0&0&1&0&1&0&0&1&0&0&0&0&0&0&0&0\\
0&0&0&0&0&0&0&0&0&0&0&0&0&1&0&1&0&0&1&0&0&0&0&0&0&0\\
0&0&0&0&0&0&0&0&0&0&0&0&0&0&1&0&1&0&0&1&0&0&0&0&0&0\\
0&0&0&0&0&0&0&0&0&0&0&0&0&0&0&1&0&1&0&0&1&0&0&0&0&0\\
0&0&0&0&0&0&0&0&0&0&0&0&0&0&0&0&1&0&1&0&0&1&0&0&0&0\\
0&0&0&0&0&0&0&0&0&0&0&0&0&0&0&0&0&1&0&1&0&0&1&0&0&0\\
0&0&0&0&0&0&0&0&0&0&0&0&0&0&0&0&0&0&1&0&1&0&0&1&0&0\\
0&0&0&0&0&0&0&0&0&0&0&0&0&0&0&0&0&0&0&1&0&1&0&0&1&0\\
0&0&0&0&0&0&0&0&0&0&0&0&0&0&0&0&0&0&0&0&1&0&1&0&0&1
\end{bmatrix}$$

The above example can be extended to cover any cyclic code. For example, if g(X) is a generator polynomial of a Hamming code, then g(X)(1+X) also generates a cyclic code $C^+$ with parameters (n, k−1) and $d_{min}$=4. The ordinarily skilled artisan readily understands that $C^+$ may be implemented as a servo code, as described above, such that the adjacent encoded track addresses differ in four positions (instead of the three described previously). In additional embodiments, the invention may provide that adjacent track addresses differ in any constant number of positions ($d_{min}$).

The ability of the instant invention to correct errors is explained as follows through the example of a Hamming code. Consider the following 12 bit sequence, wherein the 1st, 2nd, 4th and $8^{th}$ bit places are held by parity bits P1, P2, P4 and P8, respectively, and bit places 3, 5-7 and 9-12 carry data:

P1, P2, 1, P4, 1, 0, 0, P8, 0, 1, 0, 0.

The P1 parity bit is a logic function represented by bits (3, 5, 7, 9 and 11) being XOR'd such that 1+1+0+0+0=0. The P2 parity bit is a logic function represented by bits (3, 6, 7 10 and 11) being XOR'd such that 1+0+0+1+0=0. The P4 parity bit is a logic function represented by bits (5, 6, 7 and 12) being XOR'd such that 1+0+0+0=1. The P8 parity bit is a logic function represented by bits (9, 10, 11 and 12) being XOR'd such that 0+1+0+0=1. The resultant bit sequence (after XOR'ing to obtain parity bits P1, P2, P4 and P8) is:

0, 0, 1, 1, 1, 0, 0, 1, 0, 1, 0, 0.

If data received or read from memory is correct, then the previous data sequence is identical, and four check bits are evaluated such that a reading of 0, 0, 0, 0 results. That is, a first XOR is taken of bits (1, 3, 5, 7, 9 and 11), such that 0+1+1+0+0+0=0; a second XOR is taken of bits (2, 3, 6, 7, 10 and 11), such that 0+1+0+0+1+0=0; a third XOR is taken of bits (4, 5, 6, 7 and 12), such that 1+1+0+0+0=0; and yet a fourth XOR is taken of bits (8, 9, 10, 11 and 12), such that 1+0+1+0+0=0. Therefore, because all of the XOR'd check bits are "0," there is no error in the data that has been received or read.

If data received or read from memory is not correct, then the data sequence is not identical, and XOR'ing the four check bits reveals not just the error, but the location of the error. Consider, for instance, that the third bit in the above-cited sequence was errantly transmitted or read as a "0." In this case, the data sequence would read as:

0, 0, 0, 1, 1, 0, 0, 1, 0, 1, 0, 0.

The four check bits are evaluated, such that a reading of {P8, P4, P2, P1}={0, 0, 1, 1} results. That is, a first XOR is taken of bits (1, 3, 5, 7, 9 and 11), such that 0+0+1+0+0+0=1; a second XOR is taken of bits (2, 3, 6, 7, 10 and 11), such that 0+0+0+0+1+0=1; a third XOR is taken of bits (4, 5, 6, 7 and 12), such that 1+1+0+0+0=0; and yet a fourth XOR is taken of bits (8, 9, 10, 11 and 12), such that 1+0+1+0+0=0. The result is a binary number of 0011 (3), which reports not only that a bit is in error, but that its location is the third place in the sequence. Therefore, based on the previous, an embodiment of the present invention can not only detect a resultant error, but the location of the error, allowing easy correction by simply changing the bit in the noted bit place to its opposite.

Figure 4:
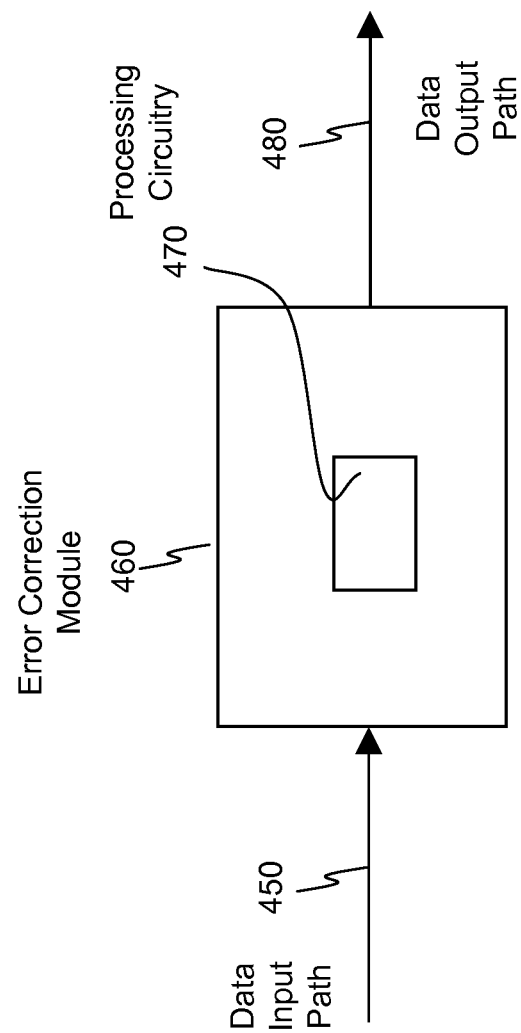
FIG. 4 illustrates an embodiment of the invention including a device for receiving and processing data, for example, data received from a data storage device, such as the device depicted in FIG. 1.

FIG. 4 illustrates an embodiment of the invention including error correction circuitry 460 that includes a data input path 450, processing circuitry 470 and a data output path 480. The embodiment shown in FIG. 4 may be used, for example, with the data storage device depicted in FIG. 1. The device 460 may be a read channel for reading from a data storage device or for reading from any device possessing data to be read.

As shown in FIG. 4, a readable surface with data is read and this data is then input to the data input path 450. Examples of readable surfaces include the storage area of a hard drive, a floppy drive, a CD ROM or an optical drive. In other embodiments, the data need not be provided from a readable surface, but may be read from a memory or input from a processor or a computer, for instance. In additional embodiments, the data may constitute adjacent bit words in a telecommunications data stream and/or adjacent bit words in a wireless network for reception and processing by the instant invention. (In yet additional embodiments, the data may actually be written by a servo track writer to a hard disk, for instance, as described herein.)

In any event, data is input to data input path 450, wherein the data (in the exemplary embodiment) is comprised at least in part by modified Hamming code encoded track addresses, as has been described herein. The modified Hamming code encoded track addresses are provided with a set difference between adjacent code bit sequences that are a constant number of bits, wherein this constant number equals $d_{min}$, or a minimum Hamming distance.

The modified Hamming code encoded track addresses are input to data path 450 in the error correction module 460, where they are then routed to the processing circuitry 470. In processing circuitry 470, the parity bits included with the modified Hamming code encoded track addresses are checked, as has been described previously. In this manner, the error correction module 460 is provided with the knowledge of whether the received modified Hamming code encoded addresses are correct (or incorrect). Further, the processing function 470 is enabled to correct at least one of any detected bit errors. That is, as explained above in the discussion concerning correcting errors with a Hamming code, the processing circuitry 470 is provided with the ability to know which bit in a bit word is incorrect.

Because an incorrect bit is either a "1" or a "0," the processing circuitry 470 can then simply correct the incorrect bit by changing the known incorrect bit to its precise opposite. Data (including any corrected data) is then output via data output path 480. Data output path 480 may lead to a computer or a computer system, a telephonic or wireless and/or other communication system.

The ordinarily skilled artisan readily comprehends that the processing circuitry 470 need not be hardware, and that the processing circuitry might be software, and/or might be a combination of hardware and software. For instance, the processing circuitry 470 might be the logic function of a logic circuit or might be a look-up table, or possibly a look-up table stored in an EEPROM (electronically erasable programmable read only memory) or similar memory device.

Figure 5:
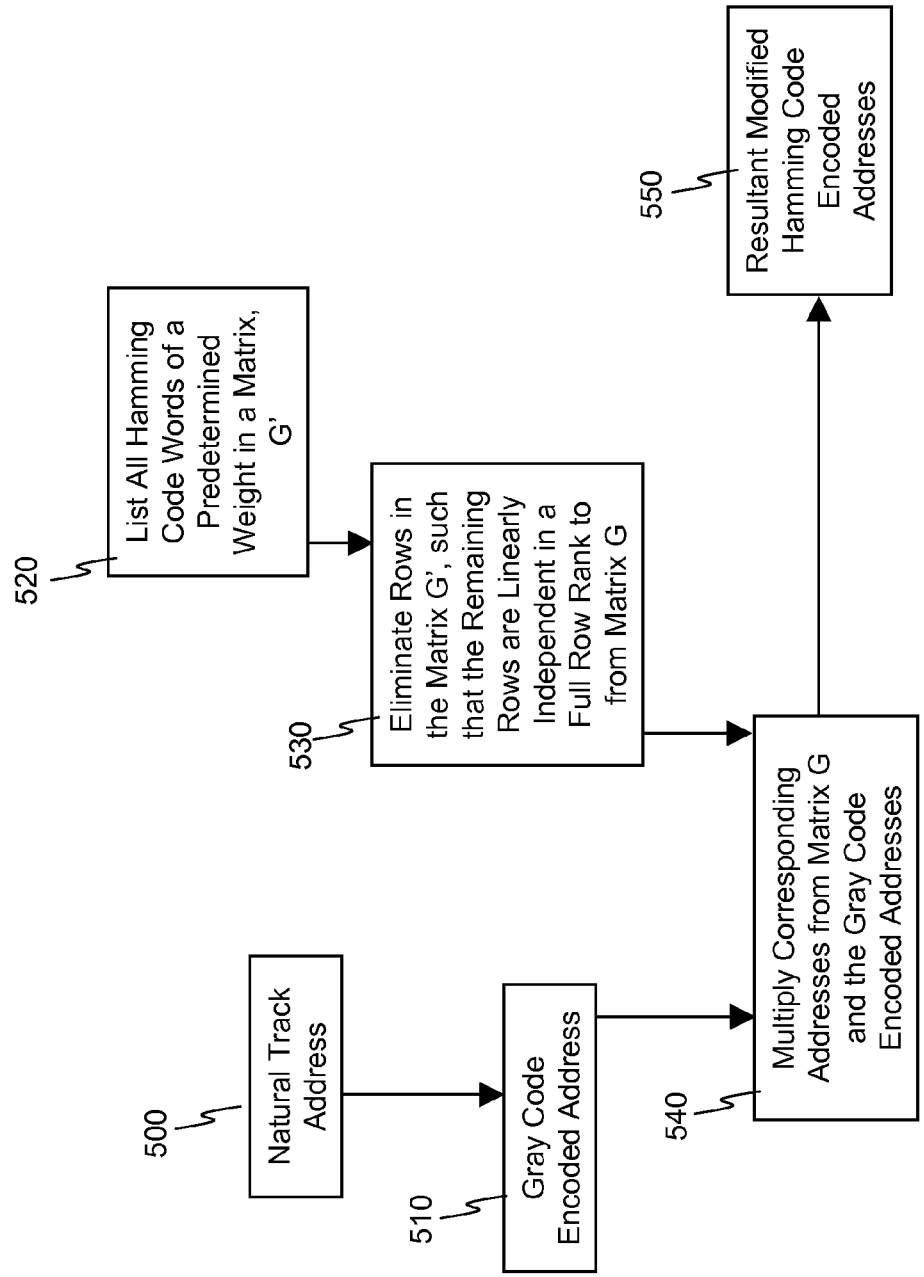
FIG. 5 is a flow diagram illustrating a method for encoding track addresses according to one aspect of the invention.

FIG. 5 is a flow diagram of a method according to one aspect of the invention. Element 500 represents the natural track addresses of a readable surface. Element 510 represents how the natural track addresses 500 have been converted to Gray code encoded track addresses. Element 520 represents the instant invention listing all of the Hamming code words of a predetermined weight to produce a matrix, G'. Element 530 represents the elimination of rows in the G' matrix such that all remaining rows are linearly independent in a full row rank to from matrix G. Element 540 represents the multiplication of corresponding addresses from the Gray code encoded addresses with the matrix G to produce the modified Hamming code encoded addresses shown by element 550.

Figure 6:
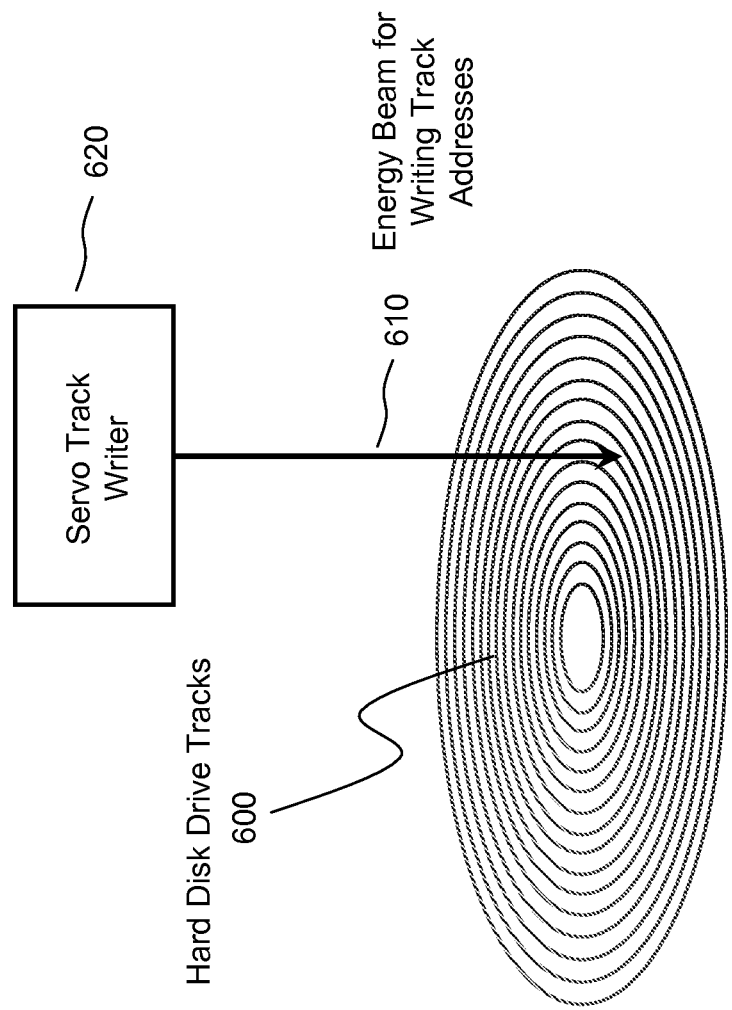
FIG. 6 illustrates an aspect of the invention in which track addresses are written to a data storage medium, such as the hard disk shown in FIG. 1.

FIG. 6 illustrates an embodiment of the invention wherein modified Hamming code encoded addresses are written to a data storage device such as a hard disk drive, for instance. The modified Hamming code encoded addresses are created as described previously and as summarized in FIG. 5. In FIG. 6, disk tracks in a hard disk drive 600 are written with the instant invention's modified Hamming code by write current 610, produced by servo writer 620, as is well known in the art. Other types of data storage devices may use other types of servo or other formatters, as the ordinarily skilled artisan will understand.

Figure 7:
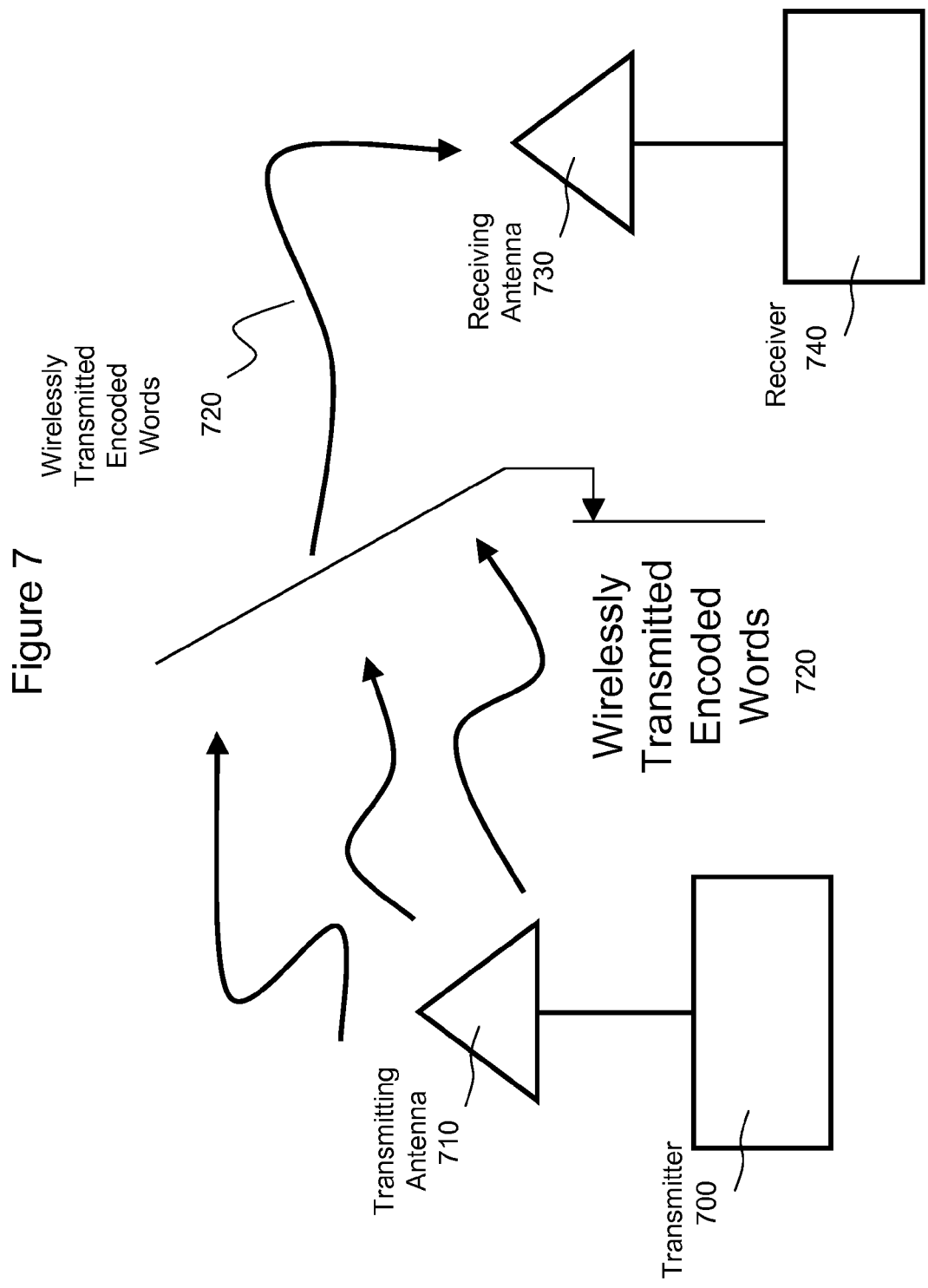
FIG. 7 illustrates wireless communications which are encoded, transmitted and received in accordance with the principles of an embodiment of the invention.

FIG. 7 illustrates an embodiment of the invention wherein modified Hamming code encoded identifiers are used to identify encoded words in a wireless transmission while simultaneously allowing the correction of at least one bit error when the encoded words are received at a reception device in accordance with the principles of the invention previously described. As shown in FIG. 7, transmitter 700 wirelessly transmits words 720 (that have been encoded in accordance with the principles of the invention as previously described) via transmitting antenna 710.

In one embodiment, the encoded words 720 have been encoded with a modified Hamming code, for instance as described previously and as represented by FIG. 5. The modified Hamming code encoded words 720 are received at receiving antenna 730 and are then processed by receiver 740. The processing of received words is provided in accordance with the principles of the invention that have been previously described. That is, each transmitted word and/or data packet includes an identifier that has been encoded with the invention's modified Hamming code (or other cyclic code that complies with the principles of the invention as described herein) such that adjacent ones of said identifiers possess the qualities of being $d_{min}$ apart. Further, received words are simultaneously capable of being automatically corrected if they possess bit errors, as has been previously described.

The previous description of embodiments is provided to enable a person skilled in the art to make and use the present invention. Various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment. Therefore, the present invention is not intended to be limited to the embodiments described herein but is to be accorded the widest scope defined only by the claims below and equivalents thereof.

What is claimed is:

1. A device comprising:
   an output configured to output encoded words, wherein
      each consecutive pair of the encoded words comprises a first encoded word and a second encoded word,
      for each of the consecutive pairs of the encoded words, the first encoded word has a predetermined number of bits with different values than bits in the second encoded word,
      each of the encoded words has an identifier,
      the identifiers of the encoded words are (i) binary numbers, and (ii) Gray code encoded, and
      each of the binary numbers is represented as $\{d_1, d_2, \ldots d_{n-1}, d_n\}$; and
   a processing circuit configured to (i) process the encoded words to enable a correction of at least one bit error in the encoded words, (ii) encode the identifiers with a cyclic code, and (iii) derive the cyclic code by listing cyclic code words of a predetermined weight in a matrix G', wherein the matrix G' includes A rows and n columns, where A is a number of the cyclic code words with the predetermined weight, and n is an integer.

2. The device of claim 1, wherein the cyclic code is a Hamming code.

3. The device of claim 2, wherein the processing circuit is configured to derive the Hamming code by listing all Hamming code words of the predetermined weight in the matrix G', where A equals a number of Hamming code words with the predetermined weight.

4. The device of claim 3, wherein the processing circuit is configured to, while deriving the Hamming code:
   eliminate A-k rows of the matrix G', wherein remaining rows k of the matrix G' are linearly independent as a full row rank, and wherein the full row rank forms a matrix G; and
   multiply each of the identifiers with a corresponding identifier from the matrix G to produce modified identifiers, wherein the modified identifiers are Hamming code encoded.

5. The device of claim 1, wherein the encoded words include a predetermined number of parity bits to enable the correction of the at least one bit error.

6. The device of claim 1, wherein each of the identifiers identifies at least one of (i) an order of a track address within a plurality of track addresses, or (ii) an order of the encoded words.

7. A device comprising:
   an output configured to output encoded words, wherein
      each consecutive pair of the encoded words comprises a first encoded word and a second encoded word,
      for each of the consecutive pairs of the encoded words, the first encoded word has a predetermined number of bits with different values than bits in the second encoded word,
      each of the encoded words has an identifier,
      the identifiers of the encoded words are (i) binary numbers, and (ii) Gray code encoded, and
      each of the binary numbers is represented as $\{d_1, d_2, \ldots d_{n-1}, d_n\}$; and
   a processing circuit configured to process the encoded words to enable a correction of at least one bit error in the encoded words,
      wherein the encoded words include a predetermined number of parity bits to enable the correction of the at least one bit error, and
      wherein the processing circuit is configured to check the parity bits using at least one of a look up table, a logic function, or a logic circuit.

8. The device of claim 1, wherein the predetermined number of bits is three.

9. A device comprising:
   output means for outputting encoded words, wherein
      each consecutive pair of the encoded words comprises a first encoded word and a second encoded word,
      for each of the consecutive pairs of the encoded words, the first encoded word has a predetermined number of bits with different values than bits in the second encoded word,
      each of the encoded words has an identifier,
      the identifiers of the encoded words are (i) binary numbers, and (ii) Gray code encoded, and
      each of the binary numbers is represented as $\{d_1, d_2, \ldots d_{n-1}, d_n\}$;
   processing means for processing the encoded words to enable a correction of at least one bit error in the encoded words; and
   encoding means for (i) cyclic code encoding the identifiers, and (ii) listing cyclic code words of a predetermined weight in a matrix G', wherein the matrix G' includes A rows and n columns, where A equals a number of the cyclic code words with the predetermined weight, and n is an integer.

10. The device of claim 9, wherein the encoding means Hamming code encodes the identifiers.

11. The device of claim 10, wherein the encoding means comprises listing means for listing all Hamming code words of the predetermined weight in a matrix G', where A equals a number of Hamming code words with the predetermined weight.

12. The device of claim 11, wherein the encoding means comprises:
   eliminating means for eliminating A-k rows of the matrix G', wherein remaining rows k of the matrix G' are linearly independent as a full row rank, and wherein the full row rank forms a matrix G; and
   multiplying means for multiplying each of the identifiers with a corresponding identifier from the matrix G to produce a modified identifier, wherein the modified identifiers are Hamming code encoded.

13. The device of claim 9, wherein the encoded words comprise inclusion means for including a predetermined number of parity bits to enable the correction of the at least one bit error.

14. The device of claim 13, wherein the processing means checks the parity bits using at least one of a look up table, a logic function, and a logic circuit.

15. The device of claim 9, wherein the predetermined number of bits is three.

16. The device of claim 9, wherein each of the identifiers identifies at least one of (i) an order of a track address within a plurality of track addresses, or (ii) an order of encoded words in the plurality of encoded words.

17. A method comprising:
   outputting encoded words, wherein
      each consecutive pair of the encoded words comprises a first encoded word and a second encoded word, for each of the consecutive pairs of the encoded words, the first encoded word has a predetermined number of bits with different values than bits in the second encoded word, each of the encoded words has an identifier, the identifiers of the encoded words are (i) binary numbers, and (ii) Gray code encoded, and each of the binary numbers is represented as $\{d_1, d_2, \ldots d_{n-1}, d_n\}$;

processing the encoded words to enable a correction of at least one bit error in the encoded words;

encoding the identifiers with a cyclic code; and deriving the cyclic code by listing cyclic code words of a predetermined weight in a matrix G', wherein the matrix G' includes A rows and n columns, where A is a number of the cyclic code words with the predetermined weight and n is an integer.

18. The method of claim 17, further comprising deriving the cyclic code by listing all Hamming code words of the predetermined weight in the matrix G', where A equals a number of Hamming code words with the predetermined weight.

19. The method of claim 18, further comprising, while deriving the cyclic code:

eliminating A-k rows of the matrix G', wherein remaining rows k of the matrix G' are linearly independent as a full row rank, and wherein the full row rank forms a matrix G; and multiplying each of the identifiers with a corresponding identifier from the matrix G to produce a modified identifier, wherein the modified identifiers are Hamming code encoded.

20. The method of claim 17, wherein the encoded words include a predetermined number of parity bits to enable the correction of the at least one bit error.

* * * * *